United States Patent
Vajda

[15] 3,637,482
[45] Jan. 25, 1972

[54] IONIC CORROSION AND SCALE REMOVAL SYSTEM FOR PLUMBING

[72] Inventor: Geza L. Vajda, 4561 West 160th St., Lawndale, Calif. 90260

[22] Filed: Aug. 22, 1967

[21] Appl. No.: 662,413

[52] U.S. Cl..............................204/228, 204/149, 204/272, 204/276, 204/284, 204/290 R
[51] Int. Cl. ........................................B01k 3/00, C22d 1/02
[58] Field of Search..................204/272, 275, 276, 284, 228, 204/290 R, 130, 33

[56] References Cited

UNITED STATES PATENTS

| 671,946 | 4/1901 | Holland | 204/276 |
|---|---|---|---|
| 2,522,082 | 9/1950 | Arnold | 204/33 X |
| 2,852,455 | 9/1958 | Hausner | 204/228 X |
| 2,864,750 | 12/1958 | Hughes Jr. et al. | 204/275 X |
| 3,026,259 | 3/1962 | Phillips | 204/276 X |
| 3,378,479 | 4/1968 | Colvin et al. | 204/276 X |

Primary Examiner—John H. Mack
Assistant Examiner—D. R. Valentine
Attorney—Norman L. Chalfin

[57] ABSTRACT

This invention describes a novel scale and corrosion prevention and removal method and means for water systems, wherein alternating current fields are applied to the water at predetermined prime number frequencies to condition the water electrically which results in the breakup of ionic components in the water, usually responsive for corrosion and scale formation, thereby preventing the development of scale or corrosion in the water system plumbing and, in effect, dissolving scale and corrosion which may already be present.

4 Claims, 6 Drawing Figures

PATENTED JAN 25 1972 3,637,482

GEZA L. VAJDA
INVENTOR.

BY Norman L Chalf
AGENT.

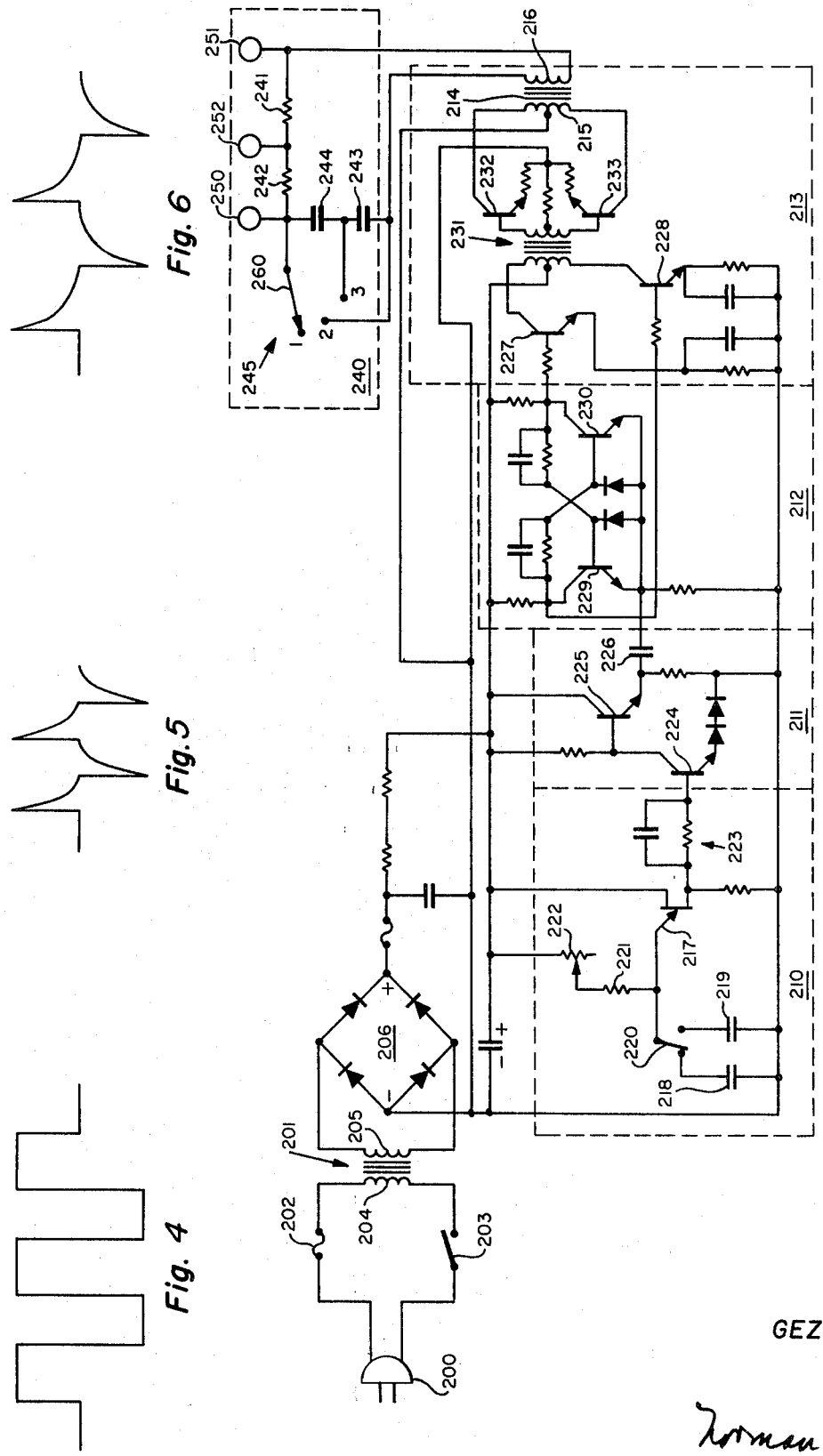

3,637,482

IONIC CORROSION AND SCALE REMOVAL SYSTEM FOR PLUMBING

BACKGROUND OF THE INVENTION

One of the modern concepts of the structure of the water molecule is its lopsided shape in which the two hydrogen atoms hang on one side of the oxygen atoms at about an angle of 105°. One effect of the lopsided structure is an unequal distribution of electric charge wherein the molecule is more positively charged on its hydrogen side and more negatively charged on its oxygen side forming, in effect, an electrical dipole. This is much like the opposite polarities one runs into in a bar magnet.

The electric charges will behave in the manner of a magnet in that they will be attracted to their respective oppositely poled electric charges of other molecules (ions).

In some substances the atoms are held together by simple electrical attraction rather than by covalent bonds. For this reason, a water molecule may be able to wedge its way between two ions that form a salt. The dipole effect of the water molecule will cancel some of the electrical attraction between the salt ions. The weakening of the attraction permits the ions to move further apart making more room for the water and its disruptive dipole effect. In this way the water works its way between such ions, cancels their mutual attraction and separates them. The separated ions are ultimately surrounded by water, that is, dissolved. Many of the components held together by this ionic bond readily dissolve in water.

Soluble polar or mineral compounds are usually held together in the solid state by ionic bonds. The acidic elements or radicals in the crystalline material have captured electrons from metallic elements, with the result that acid radicals are negatively charged and metals are positively charged.

Ionization occurs when a high-velocity particle or photon strikes an atom in its path and drives an electron from its orbit in the atom. The atom is thus left with an excess of positive charge becoming a positive ion. The freed electron received by another element or atom makes it more negatively charged and, hence, a negative ion. The ions (negative and positive resulting from an ionizing event) are termed an ion pair.

Ion polarization in water systems is the process which is achieved in the present invention. It is desirable to increase the path in which the ion polarization is occurring so that mineral elements (in ion form), or other ion pair substances dissolved in the water, remain in solution and do not, by the reverse processes of combining with metals in the water system plumbing, become solid either through combination therewith or with other elements or other ionic molecules in the water. The increased path of ionization or polarization in the present invention is achieved through electrodes in which one may be the outer shell or it may be an inner metallic filter, and the other a central, independent pole.

Corrosion of metals is an electrochemical process and is accompanied by a flow of electric current. An oxidation reaction is generally described as the method by which metal corrodes and is an anodic reaction. The converse, reduction, is a cathodic reaction. The electric current is carried by the negative electrodes through the metal and is carried jointly by cations and anions which migrate through a solution. In an electric current cations flow from cathode to anode while in solution they flow through the solution from anode to cathode, which is recognized as the reverse of electron flow through a metal.

As is well known, the electromotive series of metals is a table of standard single-electrode potentials arranged in order of magnitude of the electromotive forces (e.m.f.), those with the greatest e.m.f. being on top. If any two metals are immersed as electrodes in an aqueous solution of molal concentrations of the metals, the metal highest in the electromotive series enters into solution and the other will plate out. If concentrations of the ions of the two metals are different from molal concentrations, the single electrode potentials will be different from standard. The metal with the highest potential will be the anode and the e.m.f. of the cell will be the difference of the actual potentials.

If any two atoms, A and B in the electromotive series (A being higher in the series than B), are brought together to form a bond, the valence electrons in A alter their orbits in such a way as to spend a larger fraction of their time about B than the valence electrons of B do about A. The atom higher in the series, thus loses some negative charge to that lying lower. Thus, A becomes positively charged and is said to be electropositive relative to those atoms lower in the series, while B is said to be electronegative with respect to those atoms lying above it.

Nonmetals such as haloids may be said to be generally electronegative relative to the metals.

Because of the electrical nature of the reactions in chemical bonding and dissociation of elements to form molecules and their respective ion components or pairs, this inventor has devised a means for treating water based upon a physicochemical view of the reactions.

Ordinary tapwater has a large variety of compounds dissolved therein. They may be ionic molecules that dissociate into ions, or they may be nonpolar molecules. For the purpose of this invention, only the ionized components of these substances are of concern. These are the compounds in tapwater which are responsible for corrosion of pipes and water-hardness.

When a salt is solved in water, it dissociates to ions. The positively charged ion is called cat-ion and the negatively charged one is called an-ion. These charged particles are surrounded by water molecules and form a conglomeratum which is held together by the charge dipole interaction previously discussed. (The ion distorts the electron distribution of the water molecules and polarizes them.) A conglomeratum of a positive ion is surrounded mostly with conglomeratums of negative ions and this way a fairly regular structure is formed. X-ray diffraction and spectrographic experiments show that such a regularity exists and the liquid solution can be imagined as a scrambled-up solid. The detailed structure of liquids is very complicated and we do not know nearly as much about it as we do about solids which have completely regular structure and about gases which are entirely random in their structure.

This complex structure of water, whatever its fine details are, is thermodynamically stable. If one disturbs this system, it will tend to go back to this equilibrium state. One can calculate whether a system remains in thermodynamic equilibrium or whether certain changes in the system can spontaneously occur or not.

When we apply an external electric field to a solution containing ions, the ions will be effected by this field and will carry out a certain type of motion. If a DC field is applied, the ions will wander to the oppositely charged electrode and deposit on it. This phenomenon is called electrolysis. If an AC field is applied, the ions will move in one direction and change direction as the field direction is reversed. The ion movement represents current.

One more important concept has to be introduced. Any system composed of components can carry out a number of types of motions. Besides the translational and rotational motion, the system can carry out a number of different vibrational motions. Each system has its natural frequencies and can carry out vibrational motions with these frequencies (fundamental mode) with any multiples of these frequencies (overtones or harmonics) and with any combinations of these frequencies (combination modes). When a periodic force or excitation is applied to a system at these frequencies, the system will take up this vibrational motion. One can supply this external excitation in may different ways, e.g., when an AC electric field of the appropriate frequency is applied to a quartz crystal it will carry out mechanical vibrations at this frequency through the piezoelectric effect. If one, however, forces a system to vibrate at a frequency which is not a natural frequency of the system or of any of its odd harmonics (overtones), then the system will fall apart.

For the electronic treatment of the water, the problem of neutralizing the ions present in the water must be considered. The ions must be brought into such a form that they will not cause corrosion, water hardness, etc. In the electronic treatment, subject of this invention, an external AC field of appropriate frequency waveform and field strength is applied to the water. Under the influence of this field, the ions move, break out of their hydrate structure and exhibit an opportunity to meet oppositely charged partners and become neutralized.

In the choice of an appropriate frequency, the following considerations are important:

1. If the frequency is too low, say 2-10 c.p.s. electrolysis will occur.
2. If the frequency is too high, say 2,000-20,000 c.p.s. the ions will travel far enough to meet oppositely charged partners before they have to turn back.
3. Within the acceptable range of frequencies one has to pick one that is a prime number frequency. Prime numbers can be divided only by one or by themselves; therefore, we have little danger of exciting subharmonics or frequencies of which the exciting frequencies is a harmonic.

With this appropriately chosen frequency, the structure of the ion-water conglomeratum is destroyed and neutralization is possible. This new state of the water is not thermodynamically stable and as has been mentioned above, the system returns from this metastable to the thermodynamically stable original state. The rate of return is slow. The return phenomenon is called relaxation and a characteristic time, the relaxation time, is associated with it. The time required to reestablish the ion concentration within 90 percent of its original value is considered the relaxation time.

As is well known, pH is a measure of the acidic or basic condition of water. A neutral condition is a pH of 7. Maximum (basic) is 14, minimum (acidic) is 1. The relaxation is a function of pH. A higher pH produces a shorter relaxation time. A lower pH gives a longer relaxation time.

In the present invention a cell is provided through which the water to be treated is passed. The cell includes electric poles across which a continuum of rectangular pulses is applied, the pulses reversing polarity at the conclusion of each pulse.

The frequency of reversal of these pulses is approximately a prime number frequency as above described. To achieve the pulse generation and reversal, an electronic generator is provided employing transistor and other solid-state devices in an appropriate circuit to produce a relatively high output pulse amplitude.

The coupling to the water under treatment is achieved through the cell structures which provide essentially capacitive coupling so as to permit appropriate pulse shaping through the coupling network.

Accordingly, it is an object of this invention to provide water-conditioning system and method involving the ionization of water by a train of high level pulses alternately reversing in polarity with each pulse.

It is a further object of the invention to provide means for conditioning water in tapwater or other systems by the passage of the water through a cell to which is applied a train of pulses of alternating polarity and predetermined frequency.

It is another object of this invention to provide a water-conditioning technique and a system therefor, wherein the water molecules are ionized by polarizing them with a pulse train of alternating polarity and prime number frequency.

These and other objects of the invention will become more clear from the specification which follows and from the accompanying figures described therein, taken together with the appended claims.

The drawings show a preferred embodiment of the invention but should not be construed as illustrative of the only way in which the invention can be practiced since those skilled in the arts appertaining to the invention will be able to devise other embodiments thereof in view of the teachings herein within the ambit of the appended claims.

IN THE DRAWINGS

FIG. 3 is a schematic circuit diagram of the pulse generator employed in the water conditioning method to drive the cell shown in FIG. 1;

FIG. 4 is one of the waveforms of an output signal produced in the implementation of the invention;

FIG. 5 is another waveform obtained at the output of the device; and

FIG. 6 is a further output waveform generated by the device.

As has been described above, the invention herein consists of a water-conditioning cell and an electronic circuit means by which the cell is excited so as to rapidly alternate the polarity of pulse energy applied to the cell at a rate, the frequency of which is a prime member.

The method by which the water is conditioned with this arrangement is to apply pulses of high intensity and a prime number repetition rate and alternating polarity so as to create a constantly changing polarizing potential by which molecules of hard water salts already in ionic solution in the water are retained in the ionic condition, and by which molecules of the already deposited salts of the hard water, adhering to the walls of the pipes in the outlet area of the water, treated by the method, are caused to be excited into ionic form to enter into solution and thus clear the pipes.

By the above-described use of the equipment of the invention, hereinafter-described, the method is practised.

Figure 1:
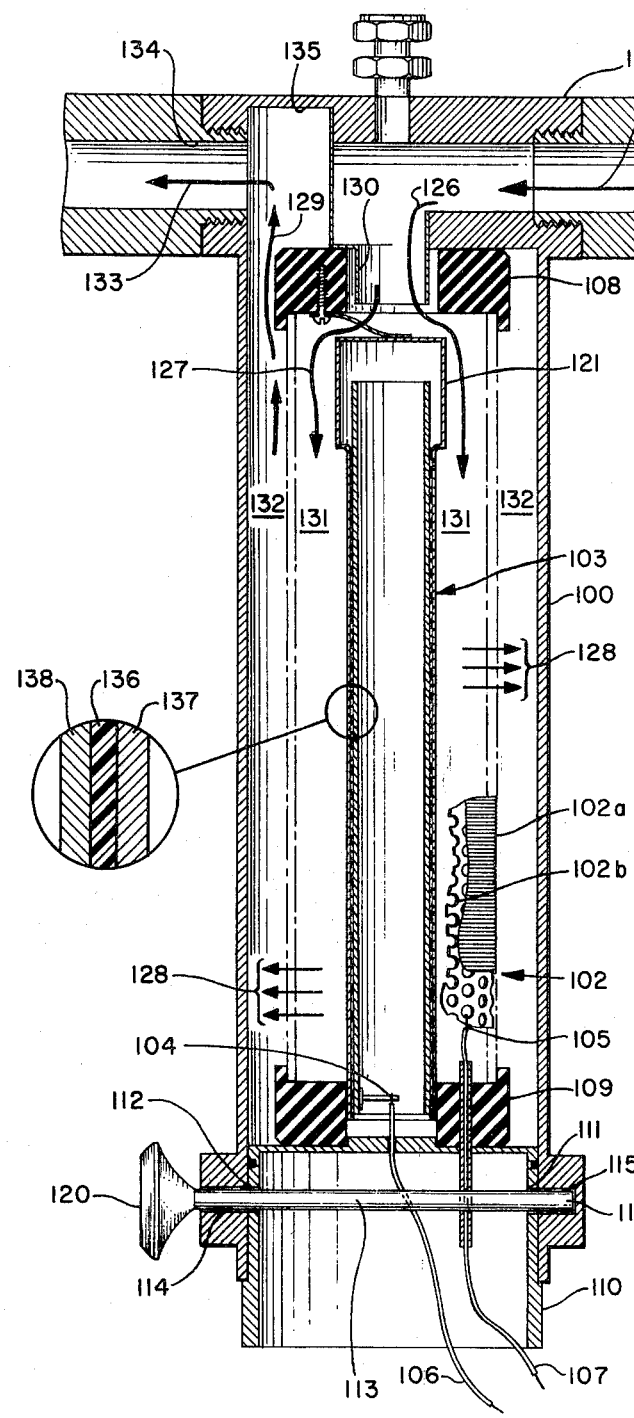
FIG. 1 is a detail partly in cross section and partly cutaway showing a water-conditioning cell embodiment used in the practice of the invention.
Figure 2:
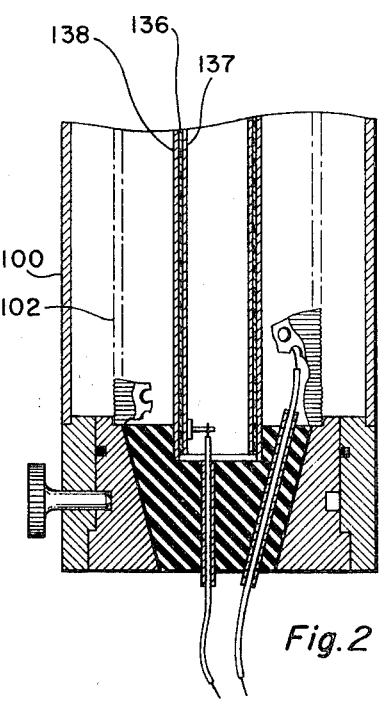
FIG. 2 is an illustration of an alternative electrode structure for use in the cell shown in FIG. 1.

The method comprises the steps of (1) applying the water to be treated to a cell such as shown in FIG. 1 for treatment; and (2) applying to the cell an electrical signal of high intensity alternating polarity and a prime number repetition rate. The shape of the signal waveform may be adjusted to several forms. The circuit diagram of the signal generator is shown in FIG. 2.

Referring now to FIG. 1, it can be seen to comprise a housing 100 in the top of which is a water supply inlet-outlet structure 101, an internal filter assembly 102, an inner electrode assembly 103, and electrical contacts 104, 105 connected to the inner electrode and filter assembly by wires 106 and 107. The electrode 103 and filter 102 are electrically insulated from one another by insulative separators 108 and 109.

In the lower portion of the cell housing 100, is a plug assembly 110 perforated through the sides 111, 112 to receive a pin 113 which goes through matching openings 114, 115 in the housing 100 aligned with plug 110 when it is in place. The opening 115 is a blind bore so that pin 113 rests in the bottom 118 thereof. A knob 120 on pin 113 facilitates removal of pin 113 so that plug 110 may be removed from housing 100 to make disassembly and assembly possible for cleaning or repair.

The inlet-outlet assembly 101 provides means for water intake to the conditioning cell 100. Water is received at the inlet indicated by arrow 125, passes through central cell inlet 130 as shown by arrows 126, 127 into the cylindrical area between pole 103 and filter 102. In the illustrative unit of FIG. 1, the filter 102 consists of a fine wire 102a wound about a foraminate cylinder 102b. Water to be conditioned entering the space 131 between electrode 103 and filter 102 passes out to space 132 through the foraminate and wire wound wall 102a, 102b, as shown by arrows 128 exiting from space 132 as indicated by arrow 129 into outlet area 135 and into the user water supply system via outlet 134 as indicated by arrow 133.

The passage of the water between electrode 103 and filter 102 places it in the field produced by the electronic system shown in FIG. 3 and further described below. This field is applied to the cell 100 through leads 106 and 107 making contact with electrode 103 at 104 and with filter 102 at 105.

The construction of electrode 103 is of particular interest. It is made up of a metallic copper cylinder 138 with a plastic insert 136 separating the outer metallic cylinder 138 from an inner aluminum foil 137. The plastic 136 insulates the copper 138 from the aluminum 137. Thus, the two surfaces 137, 138 form a capacitor so that any pulsed current applied to the electrode 103 is capacitively coupled to the water in the space between electrode 103 and the return point connected to electrode 102 (the filter).

The application of the current excites the ions in the water in the space 131 causing them to alternately move back and forth between the electrodes at a rate such that the migration of ions between the poles 102, 103 is never completed and so no deposit of these ions can occur on the electrode surfaces.

This is further described below.

With reference to FIG. 2, a circuit diagram is shown for a circuit of the type which can produce a high-level pulse signal for driving the water conditioner cell.

In FIG. 2, power is applied at a power plug 200 to a power transformer 201. A fuse 202 and a power switch 203 provide overload protection and on-off control, respectively. Transformer 201 provides a stepdown between primary 204 and secondary 205. A bridge rectifier 206 is connected across secondary 205 delivering a DC potential with the polarity indicated by the symbols + and − at the output to supply potential for the circuit as hereinafter described.

The circuit consists of four major parts; an oscillator 210, an isolation amplifier 211, a flip-flop or square wave generator 212, and an output power amplifier 213, each identified by dashed outlines, and an output transformer 214 with a step-up ratio of some 50 to 1 between its primary 215 and secondary 216.

Oscillator 210 utilizes an unijunction transistor 217, the output frequency of which is determined by either of capacitors 218 or 219, as selected by switch 220, and the total value of resistors 221 and 222 in series.

Resistor 222 is adjustable to set the frequency of oscillator 210 to a prime number value such as, say, 443 or 449, or some other frequency in this range which is a prime number. The resistance-capacitance network 223 will preemphasize the frequency of oscillator 210 (over a broad range) as the output of oscillator 210 is applied to isolation amplifier 211.

Amplifier 211 consists of a cascade of two transistors 224, 225 forming a Darlington pair. Capacitor 226 couples the output of amplifier 211 to a flip-flop circuit 212 which is of conventional configuration. The output of flip-flop 212 is direct coupled to a driver amplifier 227, 228 which comprises a push-pull pair drive by respective opposite polarity outputs 229, 230 of flip-flop 212. The output of drivers 227, 228 is transformer coupled by transformer 231 to a push-pull amplifier comprising transistors 232, 233 with their output transformer 214 previously described.

On the secondary 216 of output transformer 214 are connected an output network 240 including voltage divider resistors 241, 242, wave-shaping capacitors 243, 244, and a selector switch 245. The network 240 makes possible the shaping of the output waveform in one of several shapes by selection of a position of the arm 260 of switch 245.

The output terminals 250, 251 are coupled to the electrical input leads 106, 107 of cell 100 as shown in FIG. 1. Instruments may be connected at 251, 252 to observe the waveform or frequency of the output pulses on an oscilloscope.

When switch 245 is connected so that arm 260 is at terminal 1, as shown, the network results in an output waveform (FIG. 5). When switch 245 is connected so that arm 260 is at terminal 2, the output waveform is as shown at FIG. 4. When switch 245 is connected so that arm 260 is at terminal 3, the output waveform is as shown at FIG. 6.

It may be seen from this that the capacitors 243, 244 act as a differentiation network to sharpen the pulse. When only one is in the circuit, the pulse is broader than when both are in the circuit. The series capacitance of capacitors 241, 242, connected in series, of course, being smaller than either alone. When the capacitances are shorted as in position terminal 3 of switch 245, the output is direct and a square wave.

The operation of the system of this invention can be described with reference to FIGS. 1, 2, and 3, in particular, and the waveforms in FIGS. 4, 5, and 6, and the preceding descriptions thereof.

Water to be conditioned enters the system at inlet indicated by arrow 125 where it is discharged into the central cylinder formed by the electrode 103 and filter 102. In this area the water comes under the influence of the pulsed alternating field generated by the waveform generator of FIG. 3. Ionization of the water and any salts therein occurs with the polarities thereof, reversing with each 400 or so pulse polarity reversals so that migrations of ions, known to be a relatively slow process, never complete a path to the opposite polarity pole (either the central electrode 103 or the filter 102), thus never being able to adhere to any pole long enough to "plate out" if a metal or to combine with an oppositely poled ion (if a salt) to create a solid deposit on the walls of the pipes or electrodes.

In experimental use of the invention, water treated by equipment according to this invention has retained the salts or other components in solution for periods in excess of 24 hours.

Further results of the treatment of the water by the technique have been to draw the existing deposits on pipe walls off into solution.

The water treated in space 131 passes through the filter 102 into space 132 and out through the outer cylinder to the user piping 134.

In the user piping the effect of the treated water mentioned above (that is, causing salt deposits on the walls of the pipes to enter into solution) is believed to be the result of the fact that the water molecules have become polarized, as discussed in the introductory material hereto, and breaks apart the salt molecules as it passes through the pipe.

In a 24-hour period in a test made by this inventor, a 20 percent weight reduction was caused in a pipe section. The weight reduction was found to be due to loss of scale (hard water salts) removed from the walls and washed down the drain as the water was used. This removal continued for several days until the pipe was clean.

An alternative electrode shown in FIG. 3 is equipped to be inserted into an appropriately formed receptacle in the bottom cap 110 either by threading or force fit. By removing bottom cap 110, as shown in FIG. 1, the new electrode can be inserted from the bottom. The top area can also be made so as to be removed by threaded configurations whereby the electrode 103a can be inserted from the top into a receptacle, the leads 16a, 17a extending from the bottom.

What is claimed as new is:

1. A water conditioning system comprising:
   a polarity-reversing pulse generator having output poles providing a polarity-reversing electric current having a predetermined prime number frequency;
   a water-conditioning cell;
   a central electrode in said cell capacitively coupled to a terminal therein, said terminal being connected by conductive means to one polar output of said polarity-reversing pulse generator;
   a filter electrode concentric with said central electrode insulated from and spaced apart from said central electrode, said filter electrode being connected by conductive means to the other pole of the output of said pulse generator; and
   a housing concentrically enclosing said filter electrode and spaced apart and insulated therefrom, said housing being closed at one end and having an inlet communicating with the space between said central electrode and said filter electrode, and an outlet communicating with said space between said filter electrode and said housing, whereby water entering said water-conditioning cell through said inlet is passed between said central electrode and said filter electrode and there is subjected to the field of said polarity-reversing electric current wherein the water molecules are polarized and any ionizable substances therein are ionized, said water passing through said filter electrode into said space between said filter electrode and said housing and through said outlet to a user medium, the water being conditioned in its passage through the water-conditioning cell by the ionization of all ionizable molecules therein so that they remain in solution.

2. In the water-conditioning system defined in claim 1, the filter electrode comprising:

A foraminate metallic inner cylinder, and a wire wrapped thereabout over the length of said cylinder.

3. In the water-conditioning system defined in claim 1, the polarity-reversing pulse generator comprising:

said semiconductor oscillator operated at a prime number frequency and coupled to a multivibrator for generating a square wave at said prime number valued frequency;

a power amplifier coupled to said multivibrator; and a pulse-shaping output network coupled between said power output amplifier and said filter and said central electrodes.

4. A water-conditioning system comprising:

means for generating pulsed alternating current field of a predetermined prime number frequency value;

a concentric water-conditioning cell means including an outer shell and electrodes concentrically disposed therein, said electrodes being insulated from one another and from said outer shell, the outer of said electrodes being foraminate to provide communication from the space between said electrodes and the space between said foraminate electrode and said outer shell;

means coupled with said cell and with an external source of water supply, and communicating with the space between said electrodes concentrically disposed in said cell; and means coupled with said cell and with an external user water system, and in communication with the space between the outer of said concentric electrodes and said outer shell, said means for generating a pulsed alternating current field being connected to said electrodes, whereby water from said external supply enters said space between said electrodes, is acted upon by said prime number frequency pulses to be conditioned and passed out of said cell through said space between said outer of said electrodes and said shell to said user water system.

* * * * *